United States Patent [19]
Arens et al.

[11] 4,438,438
[45] Mar. 20, 1984

[54] METHOD FOR DISPLAYING A BATTLE SITUATION

[75] Inventors: Egidius Arens, Achim; Christoph Hampe, Ganderkesee; Ingo Karlowsky, Bremen; Manfred Meyersieck, Daverden; Hans D. Schwarz; Norbert Anding, both of Bremen; Reinhard Leisterer, Lilienthal, all of Fed. Rep. of Germany

[73] Assignee: Fried. Krupp Gesellschaft mit beschränkter Haftung, Essen, Fed. Rep. of Germany

[21] Appl. No.: 219,819

[22] Filed: Dec. 24, 1980

[30] Foreign Application Priority Data

Dec. 24, 1979 [DE] Fed. Rep. of Germany ....... 2952315

[51] Int. Cl.³ .............................................. G01S 3/02
[52] U.S. Cl. .................................... 343/451; 343/456
[58] Field of Search ........ 343/112 R, 112 D, 112 TC, 343/112 S, 112 C

[56] References Cited

U.S. PATENT DOCUMENTS

| | | | |
|---|---|---|---|
| 3,016,530 | 1/1962 | Skidmore | 343/11 |
| 3,123,824 | 3/1964 | Sherertz | 343/11 R |
| 3,652,798 | 3/1972 | McNeilly et al. | 179/15 AL |
| 3,725,918 | 4/1973 | Fleischer et al. | 343/5 EM |
| 3,981,008 | 9/1976 | Mann | 343/5 DP |
| 4,122,432 | 10/1978 | Triebold et al. | 340/15 |
| 4,149,252 | 4/1979 | Miller, Jr. | 364/456 |

Primary Examiner—Theodore M. Blum
Attorney, Agent, or Firm—Spencer & Frank

[57] ABSTRACT

A method for displaying a battle situation under consideration and indication of the movement and position of friendly forces and with the position and motion behavior of targets being derived from angle and distance information, wherein: the display takes place on an electronic display device; one or a plurality of passive bearing systems and/or passive distance measuring systems are provided to furnish angle and distance information of targets which radiate wave energy; position, course and speed are calculated for every target per time interval and displayed as motion vectors; angle and distance information on the targets from given time intervals are used for the display of target paths; markers are associated with the targets resulting from their changes in position and/or the characteristics of signals received from the bearing and/or distance measuring systems and these markers are displayed at the associated target positions; and uncertain measurement regions are calculated from the measuring tolerances of the angle and distance information and displayed for each target.

15 Claims, 4 Drawing Figures

METHOD FOR DISPLAYING A BATTLE SITUATION

BACKGROUND OF THE INVENTION

The present invention relates to a method for displaying a battle situation under consideration and indication of the movement and position of friendly forces and with the position and motion behavior of targets being recorded from angular and distance information, as well as to apparatus for practicing the method.

For such a battle situation display, it is necessary to free the measured values obtained by sensors from irrelevant information and to concentrate the measured values for a display on which an observer can observe his own and the enemy's movements, and make decisions regarding tactical consequences.

U.S. Pat. No. 3,981,008 issued Sept. 14th, 1976 discloses a target evaluation device for use with ship's radar which generates target distance information for a plurality of distance ranges. This target evaluation device forms two pulses which identify the azimuthal expanse of the target and which are stored separately in their distance ranges. This information is used to derive the speed and course of the targets which are displayed as motion vectors. The target evaluation device described in this patent, used as a ship's radar and including an active transmitting system, has the drawback that it makes active soundings and, when in operation, gives away the position of the vehicle or ship on which it is installed. Moreover, the military significance of the target cannot be recognized so that the observer requires further information to determine how to adjust the motion behavior of his own vehicle to find ways to fight the enemy targets.

SUMMARY OF THE INVENTION

It is therefore the object of the present invention to provide a method for displaying a battle situation without requiring disclosure of the observing vehicle and wherein all target data and observing vehicle data are displayed in a particularly pleasing manner so as to enable evaluation of the battle situation and efficient weapons utilization without additional means.

The above object is accomplished by the present invention by providing a method for displaying a battle situation under consideration and indication of the movement and position of friendly forces and with the position and motion behavior of targets being recorded from angle and distance information. According to the invention: the display takes place on an electronic display device; one or a plurality of passive bearing systems and/or passive distance measuring systems are used to furnish angle and distance information of targets which radiate wave energy; the position, course and speed for every target are calculated per time interval and are displayed as motion vectors; the angle and distance information on the targets from given time intervals are used for the display of target paths; specific markers are associated with the respective targets as a result of their changes in position and/or the characteristics of associated signals received from the bearing and/or distance measuring systems, and these markers are displayed at the associated target positions; and uncertain measurement regions for each target are calculated from the measuring tolerances of the angle and distance information and displayed around the associated target position.

When a battle situation is displayed according to the method of the present invention, located targets, the observing vehicle and picture information required to clarify the battle situation, such as coordinates or legends, are identified on an electronic display by brightness signals. It is known that a vehicle has available to it combinations of instruments, i.e. transducer arrangements and associated signal processing systems, for taking bearings and determining the distance of a target which radiates wave energy, in dependence on its direction, so that angular and distance information can be furnished by such a combination of instruments. For its distance measurements, such a combination of instruments preferably utilizes the cross bearing method with offset transducer arrangement. Such a measuring method is disclosed, for example, in German Patent No. 567,322 issued Dec. 31st, 1932.

On the other hand, transducer arrangements have been provided for circular bearings which are used preferably for determining the angular information, as described, for example, in German Patent No. 1,441,482, issued Apr. 6th, 1972 for obtaining bearings of noise sources. This patent discloses a panoramic sonar system which determines the aximuth and elevation of the impinging wave energy as the angular information.

In conjunction with an angle evaluation system which considers, over a given period of time, the course and the speed of the observing vehicle, this system could also be used to determine the distance information, i.e. as a distance measuring system, as disclosed, for example, in German Patent No. 887,926 issued Aug. 27th, 1953. In that system, distance, course and speed of a noise source are passively determined by taking several bearings from stationary or moving measuring points. The time intervals between several bearings are measured and the distance from the noise source is determined therefrom with the speed being known or estimated. This measuring method employs the principle of doubling-the-angle-of-the-bow bearings.

Angle and distance information are obtained as data with reference to the vehicle. To be able to calculate positions, courses and speeds of targets, the movement of the observing vehicle is included in the calculations. On the display, the direction and speed of each target is displayed by a respective motion vector which is plotted at the position of the target and whose length and direction correspond to the speed and course, respectively, of the associated target.

The positions of the targets determined in given time intervals from angle and distance information are stored in a picture memory. The positions of preceding time intervals or precalculated positions for future time intervals can be stored and utilized for generation and display of target paths, as proposed, for example, in German Patent Application P 29 24 176.7, filed June 15th, 1979.

The target position is displayed by a target specific marker. The particular type of marker used for a specific target is obtained from evaluation of information known about the target. Such known information can be typical changes in position of the target, as for example characteristic maneuvers or travel behavior which also includes vertical movements of submarine vessels. Moreover, special characteristics of the received signals, such as the frequency curve or pulse behavior, as recorded by the passive sounding and/or distance measuring systems are also evaluated for the selection of a marker.

In an advantageous embodiment, the markers are displayed at the positions of the targets by symbols of a predeterminable shape which identify certain predeterminable types of targets and are displayed with an explanatory legend to the side of the display of the battle situation.

As is known, the angle and distance information from the bearing and distance measuring systems include specific measuring tolerances which are inherent in the systems. According to a feature of the present invention these measuring tolerances are used to calculate and to display uncertain measurement areas around the position of each target. If several measuring systems obtain values from the same targets with different measuring tolerances, the measuring results are evaluated differently and the uncertain measurement areas are derived therefrom.

In this regard, it is further known that passive distance measuring systems operating according to the cross-bearing principle require the largest possible distances between their sensors (see German Patent No. 567,322). Consequently, distance measurements made from the bow and from the stern exhibit large measuring tolerances as compared to distance measurements made over the side so that the uncertain measurement areas will differ considerably. Consequently, it might be necessary to turn the observing vehicle if a target in a measuring uncertainty area is of particular interest.

The battle situation may be displayed in polar coordinates, in a grid with degrees longitude and latitude or in a military grid. In a north reference polar coordinate display, the observing position of the observing vehicle together with the motion vector of its movement is displayed at the origin of the coordinate system so that the bearings of the targets with respect to the position of the observing vehicle can be recognized immediately. This display is of particular advantage, for example, for a submarine since these bearing values are available immediately for observation by means of a periscope.

In a grid display, angle and distance information for the target or targets and for the position of the observing vehicle converted to degrees longitude and latitude. This map-like display is of particular advantage if ocean map details are to be included in the battle situation display.

For evaluation of the development of a battle situation, it is necessary to obtain knowledge about the future motion behavior of the targets. For that reason, accordng to an advantageous feature of the method according to the invention, expected target position areas are displayed in addition to the uncertain measurement areas. For the display of these expected target position areas, the positions, course and speeds of the targets at given times are estimated according to known statistical calculations methods from the actually measured or determined positions, courses and speeds of the targets and from their measuring tolerances, and the associated expected target position areas are determined or calculated and displayed. These areas correspond generally to the associated uncertain measurement areas, but cover a larger area, since position, course and speed have also been estimated for this furture point in time. For an evaluation of the battle situation, the display of such expected target position areas has the advantage that the combattability of a target with a particular weapon is made particularly clear and the margin of safety of a decision to use the particular weapon is increased considerably.

If the individual targets move over almost the same or intersecting courses, it is of advantage to use different line elements, such as dots or dashes, to display target paths.

Uncertain measurement areas, expected target position areas and positions of targets can be shown in different colors. Moreover, it is of particular advantage to reduce the intensity of the expected target position areas with respect to symbols, motion vectors and line elements.

According to a further feature of the method according to the invention, the depth of a target is calculated from the angle information in elevation and from the distance information, and this depth is displayed in association with the target. A depth indication is displayed by selecting the marker for this target in the display of the battle situation and/or an alphanumeric indication of the depth in the legend.

To improve the display of the battle situation, another advantageous feature of the method according to the invention provides a passive bearing system for taking bearings and evaluation received signals from active transmitting systems in the form of a pulsed bearing system. Active transmitting systems generally transmit in a frequency range which is higher than that of panoramic sonar systems for taking bearings of noise sources, so that special transducer configurations and signal processing devices must be provided for this purpose. The result of the sounding is indicated by a specially emphasized cursor which extends from the observing vehicle to the target. Such a bearing system is known from German Patent No. 1,766,755 issued July 29th, 1976.

In a further, particularly advantageous feature of the method according to the invention, the signals for each target received from the passive bearing and/or distance measuring systems are subjected to a time and/or frequency analysis. This includes the determination of frequency spectra and their changes in time, as well as signal patterns, pulse shapes and pulse durations of the received signals, and these determined signal characteristics are compared with corresponding signal characteristics of known types of targets. Based on these signal characteristics, the target is identified, and the associated class or signal type is displayed by different markers. Moreover, particularly whenever the comparsion permits the conclusion that the signal is one which is typical for a weapon, a double target or a change in motion behavior, a warning which is noticeable by a special marking is displayed. The realizable advantage is particularly the objective comparability of frequency and signal characteristics. The automatic comparison of actual and stored target data takes place more quickly and reliably than an observer searching through tables, so that early and accurate identification is provided particularly for critical targets.

The advantages realized with the method according to the invention are mainly that a friendly vehicle does not give away itself by transmitting signals from reflected beam ranging systems, since the display of the combat situation according to the invention is composed only of received signals from passive bearing and distance measuring systems from which all further target data for a display of the battle situation, such as distance, position or classification features, are calculated. Moreover, targets are no longer measured in succession by directing all ranging systems onto but a single target to be displayed in the distance range of the battle situation display. By combining all target data in a single battle situation display, a high degree of automatization can be realized, transmission errors can be excluded and an up-to-date view of the situation, without the requirement for additional means, is always available.

The concentration of all data required for the display of the battle situation in a well-organized and easily interpreted display of uncertain measurement areas and expected target position areas gives increased security to the observer of the display in his decision regarding his own motion behavior and the combattability of targets.

The display of uncertain measurement areas is of particular advantage since they indicate that a target is disposed in the uncertain measurement area with close to certain probability. This display indicates whether the observing vehicle is at an unfavorable position with respect to a worthwhile target. The associated uncertain measurement area can then be reduced in that the observing vehicle maneuvers itself to a more favorable measuring position.

It is particularly favorable if the electronic display is a color picture tube because then it is possible, for example, to display the depth particularly clearly and pleasingly by graduations in color.

DETAILED DESCRIPTION OF THE PREFERRED EMBODIMENTS

Figure 1:
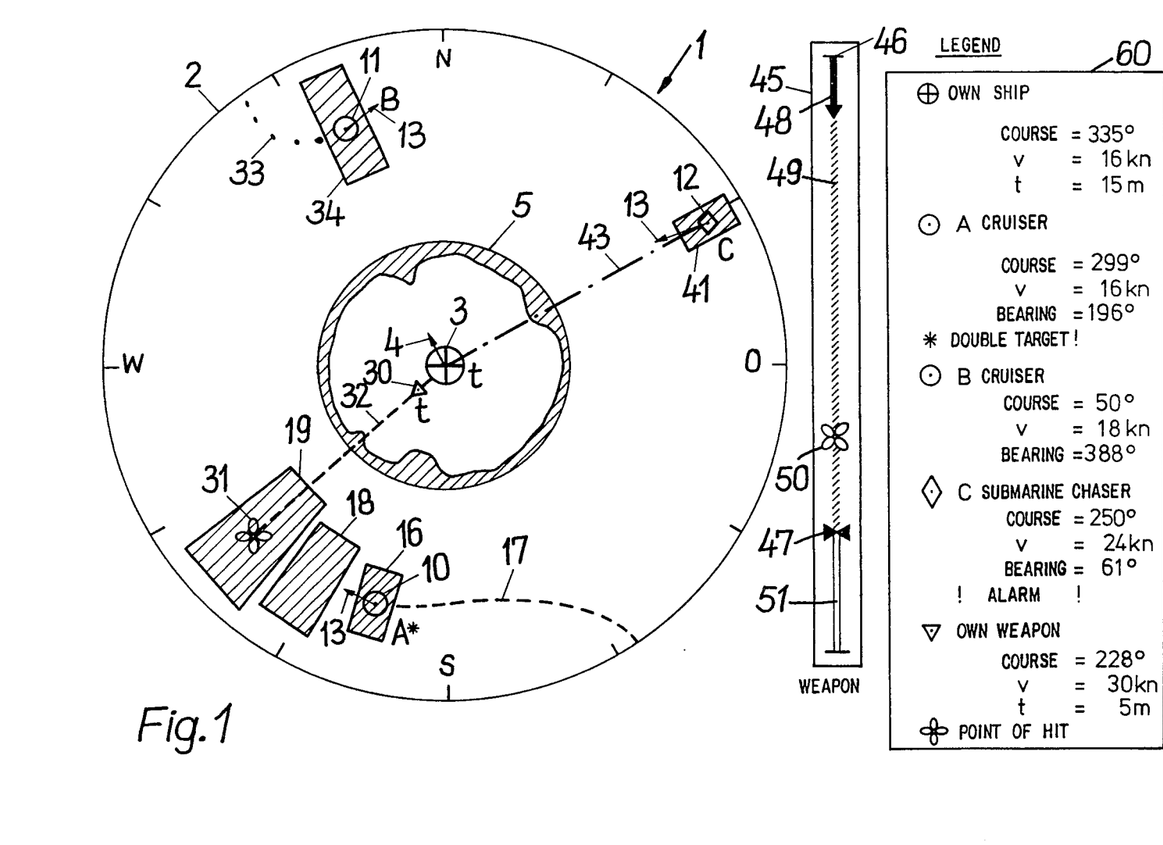
FIG. 1 shows the display of a battle situation on a screen. According to the method of the invention

FIG. 1 shows the screen 1 of a display device showing a battle situation according to the method of the invention as observed, for example, by a submarine. The display of the battle situation on the screen, is made in polar coordinates with reference to North within a compass card 2 for a selected distance range. The position of the observing vehicle 3, i.e. a submarine, is represented in the center of the display by the symbol in the form of a circle with a cross. From the center of this symbol there is plotted a motion vector 4 for the movement of the observing vehicle, with the direction of this vector 4 indicating the true course of the observing vehicle 3 and with the length of the vector 4 being a measure for the speed of the observing vehicle 3. The additional marker in the form of the letter t indicates that the observing vehicle 3 is submerged, the depth being indicated next to the letter t in a legend 60 on the display device adjacent the compass card 2.

Concentrically around the position of the observing vehicle 3 on the screen 1 there is displayed a panorama 5 of a passive bearing system. This passive bearing system measures the noise level all around the observing vehicle 3 and displays it with inwardly increasing amplitudes. Passive bearing systems of this type are particularly sensitive for indicating the direction of even more remotely disposed noise sources. This display 5 is independent of the displayed distance range of the battle situation.

The battle situation around the observing vehicle 3 is determined by the positions and motion behavior of a target A, a target B and a target C. The position of target A is symbolized by a circle 10 which has been provided with the letter A as further means of distinction. In the same way as for the movement vector 4 for the observing vehicle 3, a respective target movement vector 13 is provided to describe course and speed of each of the targets A, B and C.

Around the circle or marker 10 representing the position of target A there is entered and displayed a rectangular uncertain measurement area 16. The uncertain measurement area 16 has been determined on the basis of the measuring tolerances of the passive ranging and distance measuring system used by the observing vehicle 3 to determine the relative position of the target A. Corresponding to the larger measuring tolerances of the distance measuring system, the area 16 is larger in the radial direction than in the azimuthal direction, leading to the conclusion that the bearing system has the better discrimination. In principle, the actual position of target A, as represented by the marker 10, may be at any point in this uncertain measurement area 16.

Since the target A has been in the observation range of the passive bearing and distance measuring systems of the observing vehicle 3 for a substantial period of time, its motion behavior can be followed. From preceding positions, a target path 17, e.g. a series of dashed lines, is plotted on the display which path 17 characterizes the path of the center of gravity of the preceding uncertain measurement area. Moreover, expected target position areas 18 and 19, which were precalculated from the previous motion behavior of the target A and have a similar shape as the uncertain measurement area 16, are provided on the display. The increase in size of the expected target position areas 18 and 19 with respect to the uncertain measurement area 16, considers the uncertainties of the future motion behavior of target A, particularly the possibility that on account of maneuvering, i.e. due to changes in course or speed, target A might take on a different position in this display.

The observing vehicle 3 is prepared to fight the target A by means of a weapon 30. Based on the known behavior of the target A, a point of impact or hit 31 of the weapon 30 on the target A has been precalculated and displayed. As shown, a position or point of impact which lies in the expected target position area 19 and is identified by a symbol in the form of a propeller has been determined and displayed. The path 32 of the weapon 30 from the position of the observing vehicle 3 to the point of impact 31 is shown as a dashed line on the display. The weapon 30, which in the illustrated battle situation is a torpedo, is identified by a triangle and the letter t, which again indicates that the weapon 30 operates at a certain depth. The depth t of the weapon 30, as well as its course and speed are displayed in the legend 60.

The target B, which is at a bearing of 350° to the right, has its position symbolically identified, as does the target A, by a circle 11. The associated motion vector 13 and target path 33 indicate the actual as well as the past motion behavior of target B. In contrast to the uncertain measurement area 16 of target A, target B is associated with a significantly larger displayed uncertain measurement area 34, particularly in the radial direction. From a comparison of these two displayed areas 16 and 34, the observer of the battle situation can tell that greater measuring tolerances had to be considered in the radial direction for the calculation of the uncertain measurement area 34 for the target B which is directly in the path of the vehicle 3 as indicated by the motion vector 4. The greater measuring tolerances for the target B are the result of the inherent properties of the passive distance measuring system whose measuring accuracy is limited in the forward and backward direction of the observing vehicle 3 as compared to the distance measuring accuracy from the side of the vehicle 3. In contrast to the target B, the target A and also the target C, whose position is represented by a marker 12 in the shape of a rhomboid or diamond, are disposed to the side of the observing vehicle 3 and thus in distance measuring ranges having smaller measuring tolerances. The target B will possibly be attacked later by the observing vehicle 3 at a time when the firing position is more favorable.

As shown in FIG. 1, and as explained above, the same marker or symbol, i.e. a circle, has been used to mark target A, (circle 10) and target B (circle 11). The reason for this is that the same signal characteristics resulted when the signals received by the passive bearing and distance measuring systems from these targets were analyzed as to time and/or frequency and possibly as to their changes in time. These signal characteristics make it possible to associate the target with a class of targets, for example, surface vessel, submarine, aircraft carrier, and/or to identify it, for example a frigate of the Bremen class. In the illustrated examples, a cruiser is symbolized by a circle as shown in the legend 60.

The target A has a star or asterisk adjacent the letter A on the display to indicate, as explained in the legend 60, that a "double target" exists at this location. This results from the time and frequency analysis for the received signals from target A which has shown that noise sources are at this position which belong to several classes. This indicates, for example that the frigate or cruiser indicated by the circle 10 is dragging one or a plurality of decoys behind it.

In the illustrated example, target C has just entered into the distance range of the display of the battle situation. Its actual position is clarified to some extent in the associated uncertain measurement area 41 by a rhomboid sitting on its tip, i.e. a diamond 12. As shown in legend 60, the rhomboid or diamond 12 identifies target C as submarine chaser.

Since the target C has only just entered into the distance range of the display, a target path for the target C cannot be shown yet at the time of the display of the battle situation. The target C is shown under a bearing of 60° oriented toward the right, and travelling in a general direction toward the observer's own vehicle 3. Between the target C and the observer's own vehicle 3, a dot-dash cursor or bearing line 43 is displayed which indicates that the observing vehicle's passive bearing system for taking bearings and evaluating signals received from active transmitting systems is receiving such signals from the target C. If the target C, whose course is toward generally the position of the observing vehicle 3 as indicated by the motion vector 13 extending from the diamond 12, approaches to such a degree that the observing vehicle 3 can be detected by enemy reflected beam ranging systems, the observing vehicle 3 would be in direct danger. Consequently, an additional direct warning is displayed by means of a change in the brightness of the marker 12 for the target C. As indicated, an alarm indication may also be provided on the legend 60.

In the illustrated example the weapon 30 to be used by the vehicle 3 to fight the target A is a wire controlled torpedo. Preferably, according to a feature of the invention, the controllability and operating time of this weapon or torpedo 30 are shown graphically in the form of a bar diagram 45 adjacent and in addition to the display of the battle situation on the compass card 2. In the display 45, the reference numeral 46 represents the point or time of start of travel of the torpedo or weapon 30 while the symbol or marker 47 represents the distance or time at which the end of the wire will be reached between the points 46 and 47, i.e., until the end of the wire is reached, the torpedo can be controlled directly by the observing vehicle 3. The completely blackened area 48 adjacent the point 46 indicates the distance or time already travelled, and hence relative amount of already played out wire, for the weapon 30 to reach the position actually shown or instaneously being represented in the battle situation display. The hatched area 49 on the display 45 corresponds to the wire length, i.e. the directly guided travel time, for the torpedo 30 which is still available, while a bright region 51 following the end of the wire symbol 47 indicates the travel time remaining for the torpedo without guidance by the observing vehicle 3. Within the hatched region 49, a propeller symbol 50 indicates the precalculated point of impact 31 indicated on the battle situation display. The advantage of the additional graph 45 is that the remaining length of wire can be indicated independently of the plotted path 32 of the torpedo 30 in the display of the battle situation.

As indicated above a legend 60 is provided adjacent the compass card display 2 to show the symbols used in the display of the battle situation and explain them in alphanumeric terms. As illustrated, this explanation includes, in addition to the features identifying the targets and their association with a known class or type of target, the parameters characteristic for their motion behavior in the form of numerical values. Of course, the parameters listed in the legend 60 as illustrated are only examples and their specific selection depends on the actual targets represented in the battle situation display.

Figure 2:
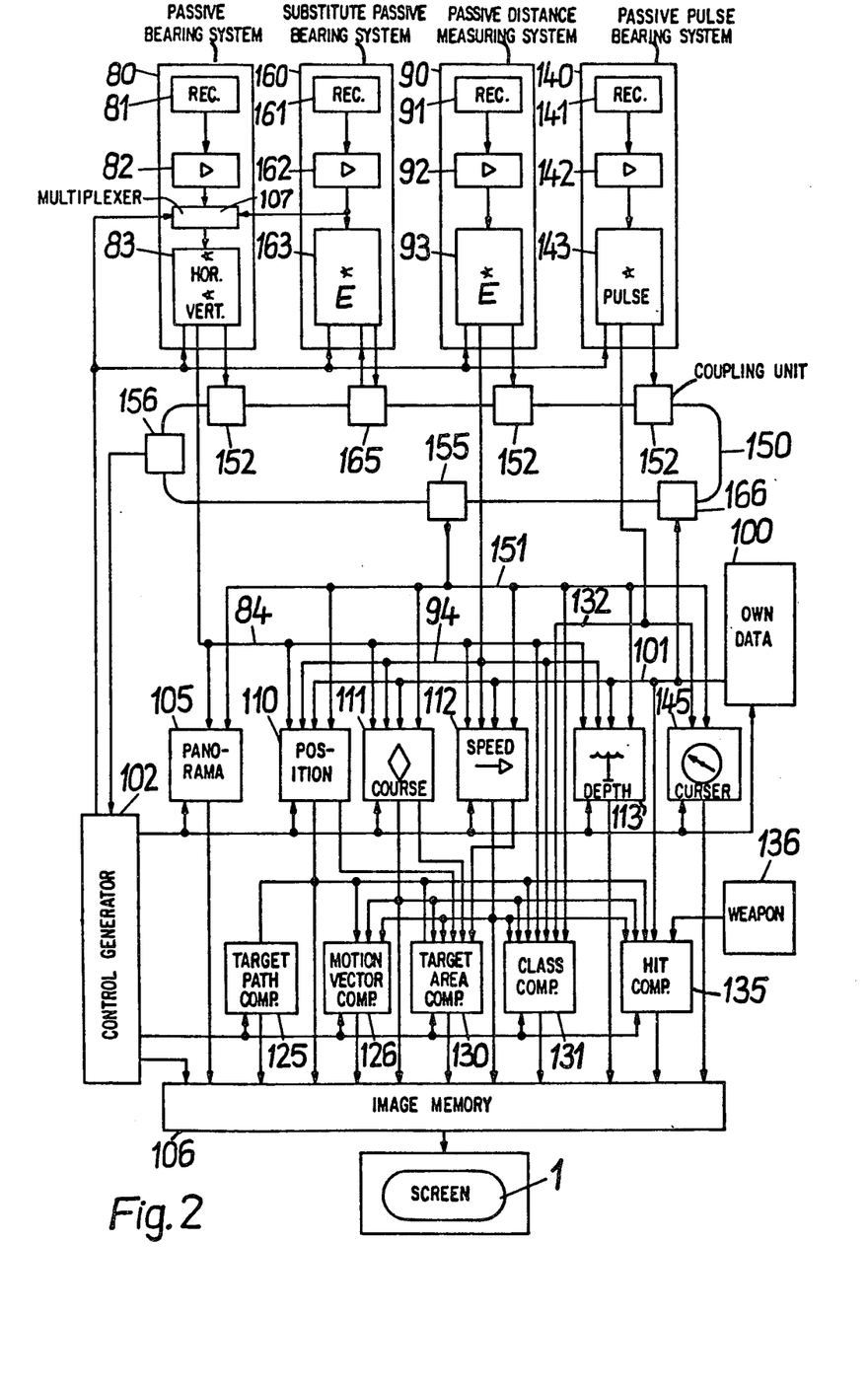
FIG. 2 is a block circuit diagram of an apparatus according to the invention for practicing the method according to the invention.

Turning now to FIG. 2 there is shown a block circuit diagram for a system for displaying a battle situation according to FIG. 1. The reference numeral 80 represents a convential passive bearing system which is equipped with a receiving arrangement 81 which receives noise over the entire azimuthal and elevation angle range. These signals, from the receiving arrangement 81 are transmitted, via preamplifiers 82, to an angle measuring system 83 in order to determine the azimuth and elevation of the angle information from the received signals. A first output of the passive bearing system 80 is connected with an angle data line 84 designed in the form of a bus bar.

A conventional passive distance measuring system 90, which includes a transducer arrangement 91 with series connected amplifiers 92 and processing unit 93, is also provided. A first output of the distance measuring system 90 is connected with a distance data line 94.

The position, course, speed and depth of the observing vehicle, i.e. the observer's own ship 3, are determined in a conventional manner in an own or observing ship data system 100 which is connected via an output with an observer's data line 101. The own ship data system 100 also has an input for receiving a control signal from a control generator 102. The passive bearing system 80 and the passive distance measurement system 90 likewise receive and are actuated by control signals from the control generator 102.

To provide the panoramic display 5 of FIG. 1, a conventional control circuit 105 for a panoramic display of the received signals over the azimuth is provided. Circuit 105 has a first signal input connected to the angle data line 84 and a control input connected with the output of the control generator 102. The output of the control circuit 105 is connected to a picture or image memory 106. With this arrangement, control pulses from the control generator 102 sent to the passive bearing system 80 cause received signals to be emitted by the bearing system 80 and transferred to the control circuit 105 for a panoramic display. In the control circuit 105 the angle and amplitude information for a complete azimuthal sweep are processed and transmitted as brightness information to the image memory 106.

In order to determine the position, course and speed of the various targets, the system is provided with a plurality of conventional signal processors, and in particular a position signal processor 110, a course or direction signal processor 111, a speed signal processor 112 and a depth signal processor 113. Each of these signal processors 110–113 has its input for the angle information connected to the angle data line 84, its input for the distance information connected to the distance data line 94, its input for the necessary data from the observing vehicle connected to the own data line 101, and its output connected to an input of the image memory 106. Each of the processors 110–113 likewise has a control input connected with an output of the control generator 102.

The signals corresponding to the actual positions of the targets, as determined by the position processor 110, are transmitted to a conventional target path computer 125, in addition to being transmitted to the memory 106. The target path computer 125 generates line elements for target paths for actual and preceding positions of the respective targets and transmits intensity signals corresponding to these line elements to the image memory 106.

In the depth processor 113 the respective depths of submerged objects, e.g. submarines, which have been found to be targets are determined from the input data to same, i.e. the data on lines 84, 94 and 101. Signals corresponding to these determined depths are transmits only to the image memory 106.

The data determined by the processors 110 to 112 regarding position, course and speed of a target are fed to a motion vector computer 126. After being enabled by the output signal from the control generator 102, the motion vector computer 126 determines the intensity signals required for displaying a motion vector from the data supplied by the signal processor 110–112 and transmits these intensity signals to the image memory 106. A computer suitable for the processing of motion vectors is well known in the art (see, for instance, the digital computer 114 of U.S. Pat. No. 3,981,008).

From their input values, the position, course and speed signal processors 110–112 calculate the associated measuring tolerances, and transmit these values, in addition to the associated data regarding position, course and speed respectively, to a target area computer 130.

In the target area computer 130, future positions at given times for selected targets are precalculated with the methods of probability calculations. Based on the supplied measuring tolerance values and the previous motion curve of these targets, the expected target position areas associated with these positions are determined in the target area computer 130. Signals corresponding to the intensities for areas and outlines of the uncertain measurement areas and/or expected target position areas are transmitted by the target area computer 130 to the image store 106. Control instructions from the control generator 102 are transmitted over respective connections to the image memory 106 and to the target area computer to cause the target area computer to take over the input data at its inputs and for causing the image memory 106 to read out the intensity signals from the target area computer suitable for 130. A computer determining the target area is disclosed in U.S. Pat. No. 3,725,918 issued Apr. 3rd, 1973.

Also connected in the overall system is a passive pulse bearing system 140 including a transducer configuration 141 with a series connected pulse amplifier 142 and a series connected pulse evaluation system 143 for evaluating foreign transmitting energy with respect to its direction of impingement and its time curve. The output of the pulse evaluation system 143 is connected to a pulse data line 132 which is connected to the input of a cursor or bearing trace generating units 145. The cursor generating unit 145 evaluates the output data from the pulse bearing system 140 present on the pulse data line 132, generates intensity signals required to produce a connecting line, for example the line 43 of FIG. 1, from the observing vehicle to the particular target on the screen 1, and transmits these intensity signals to the image memory 106 under control of the control circuit 102. The cursor processing unit 145 is well known in the art; see, for instance, the German Pat. No. 17 66 755, issued July 29, 1976, where the combination of multipliers and integrators for the product signals $U_{20}$ and $U_{21}$ is suitable to provide a trace signal.

The outputs of the position signal processor 110, the course signal processor 111, the speed signal processor 112 as well as the angle data line 84, the distance data line 94 and the pulse data line 132, are each connected to respective inputs of a classifying computer 131. Control instructions from the control generator 102 are also fed to the classification computer 131 via a control input. In a known manner, the classificaton computer 131 analyzes its input signals with respect to their time and frequency behavior as well as their changes in time. Based on the knowledge to those familiar with target recognition systems that targets are able to perform only movements or changes of movement which are characteristic for their type, that vehicles emit known noises or a characteristic, variety of noises, and that active transmitting systems emit characteristic noises and/or emit characteristic pulses, these characteristic features of the received signals are determined in the classification computer 131 and compared with known signal patterns stored in same. This comparison leads to an association of the target with a known class of targets or with an accurate identification, so that the symbol agreed upon for this association can be assigned to the associated target, whose intensities are stored in the image memory 106, for later display on the screen 1.

If the received signals analyzed in the classification computer 131 contain features of targets which indicate a danger to the observing vehicle, e.g. characteristic noise spectra of a weapon or pulses from an active transmitting system, the intensities of the associated targets on the display are used as a warning signal. For example, the star or asterisk adjacent target A of FIG. 1, are provided together with an explanation in the legend or 60, are provided the brightnesses in the markings of associated targets are rhythmically changed. The signals for producing these special indications are likewise generated in the classification computer 131 and fed to the image memory 106 for subsequent control of the screen display. The classification computer 131 is well known in the art and for instance, disclosed in the U.S. Pat. No. 4,122,432, issued Oct. 24, 1978, which shows a classifier suitable and able to generate the signals for the legend symbols, if it is adequately programmed.

Finally, the outputs of the position, course and speed processors 110 to 112 respectively, are also connected to inputs of a hit computer 135. The hit computer 135 is further connected with and receives input data from data line 101 regarding the observing vehicle and from a unit 136 which provides the required characteristic data of an available weapon which wil be used to combat a selected target. From its input signals, the hit computer 135 calculates a probable point of impact between the weapon and the selected target and generates intensity signals for the display of a hit symbol (symbol or marker 31 of FIG. 1) and a path line (32 of FIG. 1) which are transmitted to the image memory 106. As with each of the other mentioned computers, operation of the hit computer is controlled by the control unit 102. The hit computer 135 is well known in the art; see, for instance, the German Pat. No. 978,063 which shows a computer unit which can be used to compute the point of impact.

The image memory 106 is connected with the control generator 102 via a control line, through which it receives instructions for storing the intensity signals in the image memory 106 and for subsequently reading out the image memory contents for a display on the screen 1.

Preferably, as shown, the operating reliability of the system for displaying the battle situation is increased in that, the output data from the passive bearing system 80, the passive distance measuring system 90 and the passive pulsed bearing system 140 are fed not only directly to the angle data line 84, the distance data line 94 and the pulse data line 132 respectively, but are additionally fed, via a ring or circulating line 150, to a data bus line 151. The passive bearing system 80, the passive distance measuring system 90 and the passive pulse bearing system 140 are connected to the ring line 150 by respective coupling units 152 and are caused, by control instructions from the control generator 102, to transfer the associated angle and distance information to the ring line 150 via the coupling units 152. For this purpose, each of the coupling units 152 is equipped with a receiver and a transmitter as well as with additional coupling and synchronizing circuits. The transfer of the data from the line 150 to the data bus line 151 takes place by means of a coupling stage 155.

The control circuit 105, the position processor 110, the course processor 111, the speed processor 112, the depth processor 113, the bearing unit 145 and the classification computer 131 are connected to the data bus line 151 by means of respective additional inputs and are activated by address bits which are associated with the angle and distance information so as to take over the angle and distance information. For purposes of control and monitoring, the ring line 150 is connected, via a control coupling stage 156, with the control generator 102.

The determination of angle and distance information is of such primary importance for the display of the battle situation that a substitute passive bearing system 160 is provided. It includes a substitute receiving device 161, a substitute amplifier 162 and a substitute measuring system 163. The substitute bearing system 160 is connected, via an input or an output, with a substitute coupling stage 165 of the ring line 150 and can be actuated by the control generator 102. The substitute measuring system 163 furnished angle information for targets radiating wave energy and additionally determines the distance information for the target according to the principle of a double the angle of the bow bearing under consideration of the data for the observing vehicle. The data about the observing vehicle necessary for this purpose are fed to the substitute measuring system 163 via further data coupling, circuit 166 which is connected to the own data line 110 and is included in the ring line 150. The ring or circulating data line 150 is well known in the art; see, for instance, the telecommunication system as disclosed in the U.S. Pat. No. 3,652,798, issued Mar. 28, 1972, including a timing station which is part of the control generator 102 and the coupling unit 156.

Not shown in the control generator 102 are test checking systems which check the operation of the bearing, substitute bearing, distance measuring and pulse bearing systems 80, 160, 90, and 140, respectively, of the processors 110 to 113, and of the computers 125 to 131 and 135. The operational reliability of the entire system can now be increased considerably in that a multiplex circuit 107 is connected between the preamplifier 82 and the angle measuring system 83 of the bearing system 80. The second input of this multiplex circuit 107 is connected with the output of the substitute amplifier 162 of the substitute bearing system 160. When there is a malfunction in the receiving device 81 or the preamplifier 82, the multiplex circuit 107 is caused to switch over and establish a connection between the input of the angle measuring device 83 and the substitute receiving arrangement 161 and its substitute amplifiers 162 of the ranging system 160. Thus the angle information can be provided to the signal processors and other circuits used to generate the display by the more powerful angle measuring device 83, which now receives the received noise via the substitute receiving arrangement 161 and the substitute amplifier 162. Thus, by utilizing essentially the same design for the angle measuring system 83 and the substitute angle measuring device 163 for forming angle information, further additional substitute operational functions may be provided. For example, by introducing additional multiplex units, it is possible to replace circuits, such as filters, integrators or processing units, by their respective identical functions in the substitute measuring system 163 and vice versa. The control generator 102 includes an error checking circuit which is well known in the art by the German Offenlegungsschrift 26 06 669, published Aug. 25, 1977. The German application discloses a method for testing digital systems, which is suitable to check the various signal processing units and to control the multiplexer 107.

Figure 3:
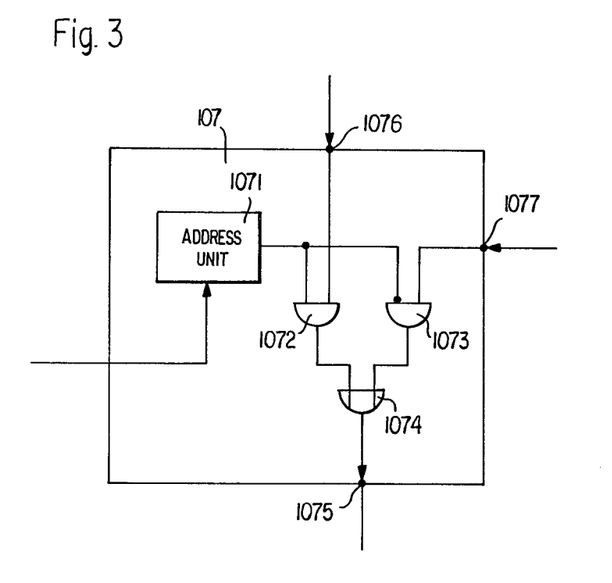
FIG. 3 is a block circuit diagram of a multiplexer suitable for substitute signal transmission according to the invention.

FIG. 3 shows a multiplexer 107, which can be used in various processing and computing circuits of the invention. The multiplexer 107 includes an address unit 1071 having an input which is connected to the control generator 102. The address unit 1071 compares addresses from the control generator with its significant address. An output of the address unit 1071 is connected to a first AND-Gate 1072 and to an inverted input of a second AND-Gate 1073 whose outputs are combined in an OR-Gate 1074 and switched to the output 1075 of the multiplexer 107. A second input of the first AND-Gate 1072 and a second input of the second AND-Gate 1073 are the inputs 1076 and 1077 of the multiplexer 107. For normal operation the address unit 1071 has a logical HIGH-signal to open the AND-Gate 1072 and all signals at input 1076 are switched to the output 1075. In case of detecting a fault in signal processing, the control generator 102 transmits an address and an operand code which is identified in the proper address unit 1071. A logical LOW-signal is generated to stop normal signal transmitting and initiate substitute signal transmitting from input 1077 to output 1075 of the multiplexer 107. The multiplexer 107 shown in FIG. 2 is connected to the amplifier 82 with its input 1076, to the substitute amplifier 162 with its input 1077, and to the angle measuring system 83 with its output 1075. It is also possible to use this multiplexer 107 in connection with the processors 110 to 113 and 145 and with the classification computer 131 to distinguish the normal data on the lines 84 and 94 from the substitute data on line 151. In this case, the input 1076 is connected to line 84 or 94 and the input 1077 to line 151. The output 1075 is connected to the corresponding input of the processors 110 to 113, 145 and the computer 131.

Figure 4:
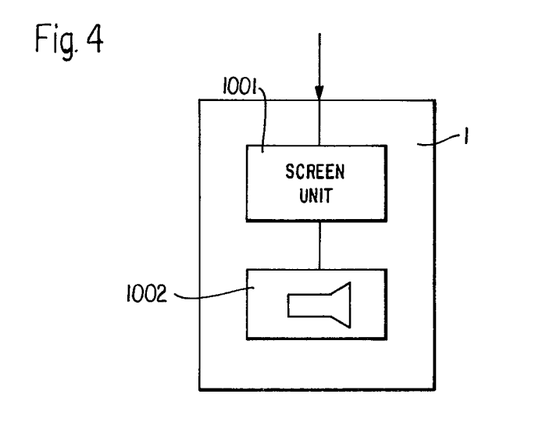
FIG. 4 is a block circuit diagram of a screen with reference to FIG. 2 suitable for coordinate transformation according to the invention.

FIG. 4 shows a modification of screen 1 in FIG. 2 including a screen unit 1001 and a cathode ray tube 1002. The screen unit 1001 transforms the data from the image memory in order to control the cathode ray tube 1002. The battle display is stored in the image memory in polar coordinates and the screen unit 1001 converts them into cartesian coordinates with a given origin. Such a screen unit 1001 is well known in the art, is disclosed, for example in the German Auslegeschrift 28 21 421, corresponding to U.S. patent application Ser. No. 799,064, filed May 20, 1977 (now U.S. Pat. No. 4,149,252, issued Apr. 10, 1979), and is suitable for displaying a battle situation with a military grid net.

It is to be understood that the above description of the present invention is susceptible to various modifications, changes and adaptations, and the same are intended to be comprehended within the meaning and range of equivalents of the appended claims.

We claim:

1. Method for displaying a battle situation under consideration and indication of the movement and position of friendly forces and with the position and motion behavior of targets being determined from angle and distance information derived at the observing or display station, comprising the steps of:

providing an electronic display device for the display of said battle situation;

furnishing angle and distance information of targets which radiate wave energy by means of at least one passive bearing and distance measuring system;

from said angle and distance information, calculating the position, course and speed of every target per time interval and indicating the calculated position, course and speed on said display as respective motion vectors;

determining the path of the targets from given time intervals from said angle and distance information about the targets, and displaying the determined target paths on said display device;

associating specific markers with the targets as a result of determined changes in position of the targets and determined characteristics of signals received from the passive bearing and distance measuring systems, and displaying said markers at the associated target positions; and calculating uncertain measurement regions for the position of each target from the measuring tolerances of the angle and distance information and displaying said uncertain measurement region around the displayed marker for the associated target.

2. A method as defined in claim 1 wherein said positions of said targets are displayed in polar coordinates with respect to the position of the observing station.

3. A method as defined in claim 1 wherein said battle situation is displayed in a grid with degrees longitude and latitude, and with the position of the observing station and the positions of the targets being displayed with respect to said grid.

4. A method as defined in claim 1 further comprising precalculating target expectation areas for given targets from the actual calculated said position, course and speed of the said given target and their associated measuring tolerances and changes in time, and additionally displaying said target expectation areas on said display.

5. A method as defined in claim 1 wherein: said step of associating specific markers include displaying each target by a symbol of a given shape at its position;

each said displayed motion vector is an arrow which is associated with a specific target symbol, with the direction of said arrow corresponding to the course and the length of said arrow corresponding to the speed of the associated target;

each said target path is displayed by line elements; and said uncertain measurement areas and said expectated target position areas are displayed with reduced intensity compared to the displayed said symbols, arrows and line elements.

6. A method as defined in claim 5 further comprising displaying a legend of the symbols and other markers used in said display separately from said display of the battle situation.

7. A method as defined in claim 1 or 5 wherein said at least one passive bearing system furnishes angle information in elevation; and further comprising calculating the depth of each target from the associated distance information and from the associated angle information in elevation, and displaying the calculated depth in association with every target.

8. A method as defined in claim 1, 4 or 5 further comprising providing a passive bearing system for taking bearings of and evaluating received signals from active transmitting systems, determining the bearing of the active transmitting system, and displaying the bearing of the active transmitting system by a cursor extending between the displayed observation station and the target having said active transmitting system.

9. A method as defined in claim 1 comprising including the measuring tolerances of the passive bearing and distance measuring systems which depend on switchable operating states in said calculation of said uncertain measurement areas.

10. A method as defined in claim 1 wherein said step of associating specific markers includes: subjecting the received signals from the passive bearing and distance measuring systems associated with each target to a time and frequency analysis, to determine the frequency spectra and their changes in time;

comparing the time curve of the received signals and the associated frequency spectra and their changes in time with signal curves over time and with the frequency spectra and their changes in time for known targets;

assigning different markers to different type targets and signals; and identifying each type target by said comparison; and displaying each said identified target by its assigned said different marker.

11. A method as defined in claim 1 further comprising: taking a bearing on a weapon fired by the observing station in the same manner as for a target; and displaying the position of the weapon with an appropriate marker on said display of the battle situation.

12. A method as defined in claim 11 further comprising displaying the remaining range and remote controllability of the fired weapon separately from said display of the battle situation.

13. Apparatus disposed on an observing vehicle for practicing the method defined in claim 1 comprising in combination: a passive bearing system, a passive distance measuring system, and a passive pulse bearing system; processing means connected in series with the outputs of said passive bearing system and said passive distance measuring system, and responsive to the output signals from same, for calculating the position, course, and speed of each detected target relative to said observing means;

respective computer means connected to the outputs of said signal processing means for calculating said motion vectors, said target paths, and said measuring uncertainty regions and for classifying targets and associating specific markers to same by determining changes in position of the targets and characteristics of their transmitted signals;

means additionally connecting said computer means for classifying to the outputs of said passive bearing system, said passive distance measuring system and said passive pulse bearing system;

an image memory having a series-connected electronic display, said image memory having its inputs connected to the outputs of each of said processing means and each said computer means; and a control generator means for transmitting control instructions to said passive bearing system, said passive distance measuring system, said passive pulse bearing system, said processing memory, said computer memory and said image memory.

14. Apparatus as defined in claim 13 further comprising a circulating data line having a plurality of data input coupling units connected to the output of said passive bearing system, the output said passive distance measuring system and the output of said passive pulsed bearing system respectively, and a pair of data output coupling units connected to said control generator means and to a data bus bar which is connected to each of said signal processing means and to said computer means for classifying; a substitute passive bearing and distance measuring system connected to said circulating data line via a substitute data coupling stage; and means, included in said control generator means, and responsive to the signals in said circulating data line, for causing said substitute passive bearing and distance measuring system to transmit appropriate signals to said signal processing means and said computer means for classifying via said data bus bar upon detection of a malfunction of said passive bearing system or said passive distance measuring system.

15. Apparatus as defined in claim 14 wherein said passive bearing system and said substitute passive bearing and distance measuring system each includes receiving transducer means connected in series with a signal processing unit; multiplexing circuit means connected between said transducer means and said signal processing unit of at least said passive bearing system, each said multiplexing circuit means having first and second signal inputs connected in series with the outputs of the respective transducers of said passive bearing system and said substitute passive bearing systems respectively, and an output connected to the input of the associated signal processing unit; and said control generator means includes means for recognizing a faulty one of said signal processing units and for actuating said multiplexing circuit means to cause the faulty said signal processing unit to be circumvented.

* * * * *